United States Patent [19]

Brolin et al.

[11] Patent Number: 4,476,559

[45] Date of Patent: Oct. 9, 1984

[54] SIMULTANEOUS TRANSMISSION OF VOICE AND DATA SIGNALS OVER A DIGITAL CHANNEL

[75] Inventors: Stephen J. Brolin, Livingston; Ralph W. Wyndrum, Jr., Bernards Township, Somerset County, both of N.J.

[73] Assignee: AT&T Bell Laboratories, Murray Hill, N.J.

[21] Appl. No.: 319,690

[22] Filed: Nov. 9, 1981

[51] Int. Cl.³ .................................................. H04J 3/12
[52] U.S. Cl. .................................. 370/110.1; 179/2 DP
[58] Field of Search .................... 370/110.1, 24, 29, 76, 370/83, 99, 111; 179/2 DP

[56] References Cited

U.S. PATENT DOCUMENTS

| | | | |
|---|---|---|---|
| 3,720,791 | 3/1973 | Tada et al. | 179/2 DP |
| 3,824,347 | 7/1974 | Sorber et al. | 179/2 DP |
| 3,875,339 | 4/1975 | Gruen et al. | 179/2 DP |
| 4,306,116 | 12/1981 | McClure et al. | 179/2 DP |
| 4,354,265 | 10/1982 | Nyberg et al. | 370/111 |
| 4,381,427 | 4/1983 | Cheal et al. | 370/110.1 |
| 4,390,986 | 6/1983 | Moses | 370/99 |
| 4,394,757 | 7/1983 | Muzumdar et al. | 370/110.1 |
| 4,403,322 | 9/1983 | Kato et al. | 370/110.1 |

Primary Examiner—Douglas W. Olms
Assistant Examiner—Wellington Chin
Attorney, Agent, or Firm—Robert O. Nimtz

[57] ABSTRACT

A transmission system comprises apparatus for the transmission of voice signals only, data signals only, or a combination of both voice and data signals in a multiplexed stream of eight bit time slots over a single, bidirectional digital channel for a point-to-point connection. In the combined mode, the encoded voice signals, using low bit rate voice encoders, are assigned to four bit positions of the eight bit time slot; the data signals are assigned to the remaining four bits. Up to two bit positions normally used for data may be used for signature bits, thereby identifying whether the multiplexed stream comprises voice signals only, data signals only, or a combination of both voice and data signals. Also, a minimum of one "1" bit per eight bit time slot is thereby guaranteed.

13 Claims, 7 Drawing Figures

FIG. 4

| D | D | D | D | D | D | D | 1 |
|---|---|---|---|---|---|---|---|

TIME SLOTS

| | | | | | | | |
|---|---|---|---|---|---|---|---|
| 1) | V | V | V | V | V | V | W | 0 |
| 2) | V | V | V | V | V | V | V | 1 |
| 3) | V | V | V | V | V | V | V | 1 |
| 4) | V | V | V | V | V | V | V | 1 |
| 5) | V | V | V | V | V | V | V | 1 |

V = 0 OR 1

(IN TIME SLOT 1) IF V = 0 IN BITS POSITIONS 1 THROUGH 6, W = 1
IF V = 1 IN AT LEAST ONE BIT POSITION
1 THROUGH 6, W = 0 OR 1

FIG. 6

TIME SLOTS

| | | | | | | | |
|---|---|---|---|---|---|---|---|
| 1) | V | V | V | V | D | D | 1 | 0 |
| 2) | V | V | V | V | D | D | D | 1 |
| 3) | V | V | V | V | D | D | 1 | 0 |
| 4) | V | V | V | V | D | D | D | 1 |
| 5) | V | V | V | V | D | D | 1 | 0 |

V = ADAPTIVE DIFFERENTIAL PCM, 0 OR 1
D = DATA, 0 OR 1

FIG. 7

| S | S | S | S | S | S | S | 0 |
|---|---|---|---|---|---|---|---|

S = 1 OR 0
RESTRICTION: "00000000" NOT ALLOWED

10

SIMULTANEOUS TRANSMISSION OF VOICE AND DATA SIGNALS OVER A DIGITAL CHANNEL

TECHNICAL FIELD

This invention relates to digital transmission systems and, more particularly, to the simultaneous transmission of voice signals and data signals in a multiplexed pulse stream of information bits over a single digital transmission channel.

BACKGROUND OF THE INVENTION

It is well-known how to transmit either voice signals or data signals over a single transmission channel. In U.S. Pat. No. 3,549,814 issued Dec. 22, 1970 to R. J. Jaeger, Jr. et al, there is disclosed a pulse code modulation system in which each channel can simultaneously transmit a voice frequency message, and at the same time, all channels together cooperatively transmit a data message. Specifically, there is disclosed a system in which a 24-bit word is transmitted simultaneously with twenty-four different voice signal words, by assigning the eighth bit-position of each eight-bit voice signal word for one of the aforesaid data bits.

Where telecommunications users would like to transmit data signals, such as graphics, and simultaneously engage in a telephone conversation, two telephone lines would be necessary. Such a method would be expensive. Alternatively, the data signals could be transmitted first over a telephone line, and the telephone conversation could follow, or vice versa. This approach would be an inconvenient method for some applications. It is therefore desirable to provide method and means whereby users can engage in a telephone conversation and, simultaneously, transmit data signals using a single telephone line, thereby making such systems both economically attractive and convenient to use.

SUMMARY OF THE INVENTION

In accordance with the illustrative embodiment of the present invention, means and methods are provided for achieving the aforesaid objective of simultaneously transmitting encoded voice samples and data signals over a single transmission channel. Voice samples are encoded using four bits per frame by the method of adaptive differential pulse code modulation and assigned to four bit-positions of each eight-bit information time slot. Up to four bits of information from the data signals are assigned to the remaining four bit-positions of each eight-bit information time slot.

The aforesaid single transmission channel can be used for the transmission of voice signals only, data signals only, or a combination of both voice and data signals. In each case, a distinctive signature is used for identifying the mode of transmission. Thus, for the transmission of data signals only, the eighth bit of every time slot is a "1". In each of the first seven bit-positions, there may be entered a "0" or a "1".

For the transmission of voice signals only, there is a frame comprising five time slots. In the first time slot, each of bit-positions one through six may have entered therein a "1" or "0". If each of the first six bit-positions have a "0" entered therein, bit-position seven must have a "1" entered therein. If, however, at least one of the bit-positions one through six has a "1" entered therein, bit-position seven may have entered therein either a "1" or a "0". Bit-position eight has entered therein a "0". In each of the remaining time slots two through five, there is entered in bit-position eight a "1". In each of the remaining bit-positions one through seven there may be entered either a "1" or a "0".

For the transmission of a combination of both voice and data signals, there is disclosed in the preferred embodiment a frame comprising five time slots. In each of these five time slots, the first four bit-positions are used for the entry of the aforesaid encoded voice signals. Each of these bit-positions may be a "1" or a "0". Whereas the preferred embodiment discloses the use of adaptive differential pulse code modulation for voice encoding, other reduced bit rate voice encoders, such as delta modulation or adaptive delta modulation, may be used.

In each of the remaining bit-positions there is entered either data bits or signature bits. In the first, third and fifth time slots, data bits "1" or "0", are entered in bit-positions five and six; a "1" is placed in bit seven, and signature bit "0" is entered in bit-position eight. In the second and fourth time slots, data bits "1" or "0", are entered in bit-positions five, six and seven; the signature bit "1" is entered in bit-position eight. Thus, the sequence of signature bits in the frame are: 010100101001010 .... The "1" bit in positions seven of time slots one, three, five ensure compatibility with T-carrier systems for clock recovery.

By varying the number of time slots in the frame, and by varying the signature, various data speeds may be derived.

Initiation and termination of a transmission sequence is effected by a sequence of time slots wherein the first seven bit-positions have entered therein signaling information and the eighth bit-position has entered therein a "0". Here, the all "0s" sequence would be excluded from allowed signaling patterns in bit-positions one through seven.

BRIEF DESCRIPTION OF THE DRAWINGS

FIG. 4 shows a bit format for the transmission of data signals only;

FIG. 5 shows a bit format for the transmission of voice signals only;

FIG. 6 shows a bit format for the transmission of a combination of both encoded voice signals and data signals over the same transmission channel; and FIG. 7 shows a bit format for the transmission of signaling information for initiation and termination.

DETAILED DESCRIPTION

Figure 1:
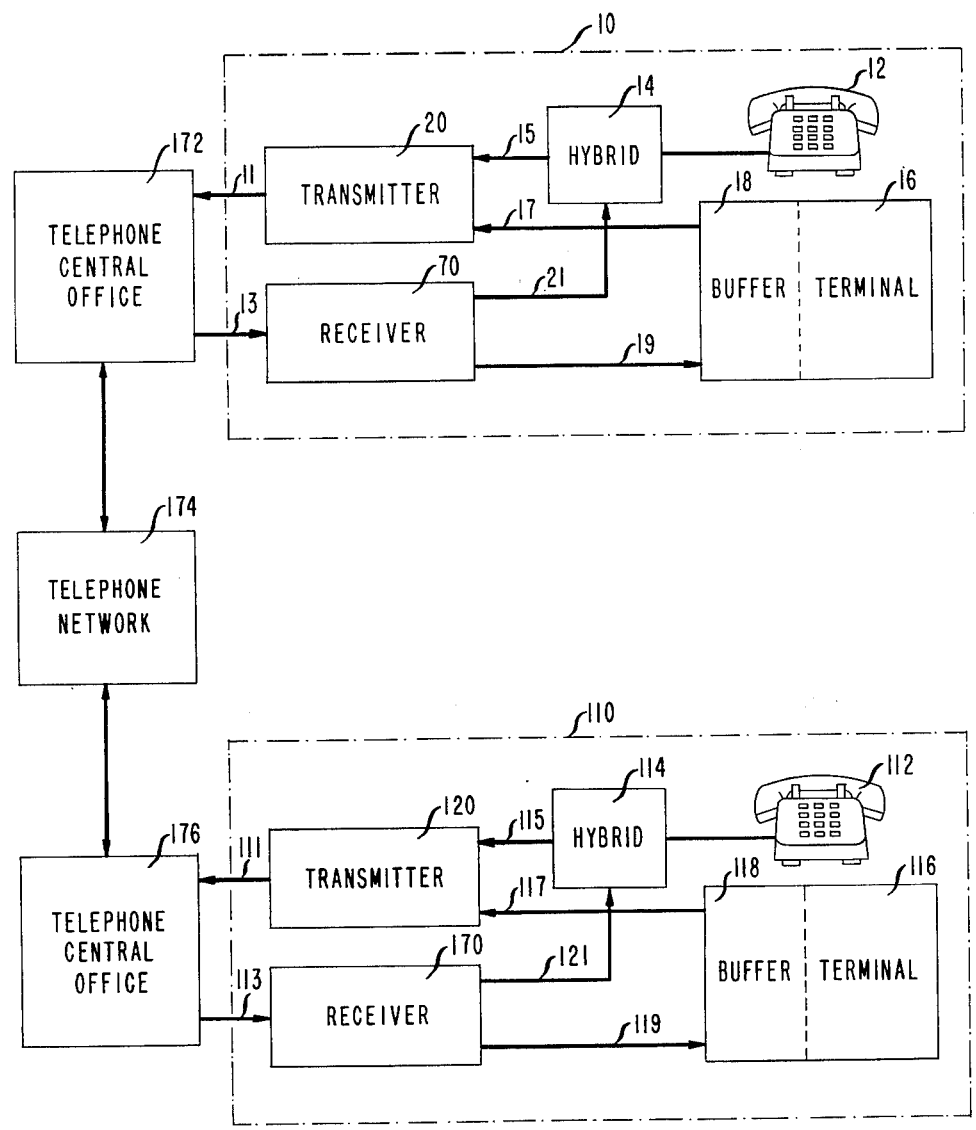
FIG. 1 shows apparatus for transmitting encoded voice signals only, data signals only, or a combination of both encoded voice signals and data signals between two telephone customer terminals interconnected through the telephone network.

Referring to FIG. 1, there is shown telecommunications apparatus at locations 10 and 110 for communications therebetween through telephone central office 172, telephone network 174 and telephone central office 176. According to one application, telecommunications apparatus at locations 10 and 110 are interconnected using a "private line," thereby providing a permanent connection therebetween. Thus, call addressing is not required and there is a permanent connection through central offices 172, 176 and telephone network 174.

Telecommunications apparatus at location 10 is connected with telephone central office 172 using two telephone subscriber loops 11 and 13. Likewise, telecommunications apparatus at location 110 is connected with telephone central office 176 using two telephone subscriber loops 111 and 113. Alternatively, a single bidirectional subscriber loop may be used between central office 172 or 176 and subscriber location 10 or 110, respectively. One such scheme is disclosed in an article entitled "A Digital Hybrid For Two-Wire Digital Subscriber Loops", by P. Tolstrup Nielsen, et al, *National Telecommunications Conference*, Dec. 1978, Vol. II, pages 21.2.1 to 21.2.7.

Referring more particularly to the telecommunications apparatus at location 10, there is shown a telephone set 12 connected to a hybrid circuit 14. Hybrid circuit 14 is a four-wire-to-two-wire coupling circuit for providing transmission of voice signals from telephone set 12 to transmitter 20. Hybrid circuit 14 also provides for reception of voice signals from receiver 70 and for transmitting the voice signals to telephone set 12.

Shown also in FIG. 1, is a data terminal 16 connected through buffer 18 to transmitter 20. Data from receiver 70 is passed through buffer 18 to terminal 16. Because data terminal 16 may operate at a different instantaneous although equivalent average rate from the transmission facility 11,13 interconnecting location 10 and telephone central office 172, buffer 18 provides a necessary interface therebetween.

Telecommunications apparatus at location 110 is similar to that at location 10 and operates in substantially the same manner, to be described more fully hereinbelow.

Voice signals only, data signals only, or a combination thereof may be transmitted between locations 10 and 110. Thus, a voice signal from telephone set 12, a data signal from terminal 16, or a combination of both voice and data signals, are multiplexed at transmitter 20 along with signature bits for identifying the type of signal being transmitted. The multiplexed signals are transmitted on lead 11 to the telephone central office 172, through telephone network 174, to telephone central office 176, and finally over lead 113 to receiver 170 at location 110.

At receiver 170, the type of signal is identified from the aforesaid signature bits. Voice signals are transmitted over lead 121 and through hybrid circuit 114 to telephone set 112. Data signals are transmitted from receiver 170 over lead 119 and through buffer 118 to terminal 116.

Transmission of signals from location 110 to location 10 is realized in substantially the same manner as described hereinabove for transmission from location 10 to location 110. Transmission from location 110 to location 10, however, need not be simultaneous. Furthermore, transmission from location 110 to location 10 may be a type of signal different from that of the opposite direction. For example, when voice signals are being transmitted from location 10 to location 110, a combination of voice and data signals may be transmitted from location 110 to location 10.

Figure 2:
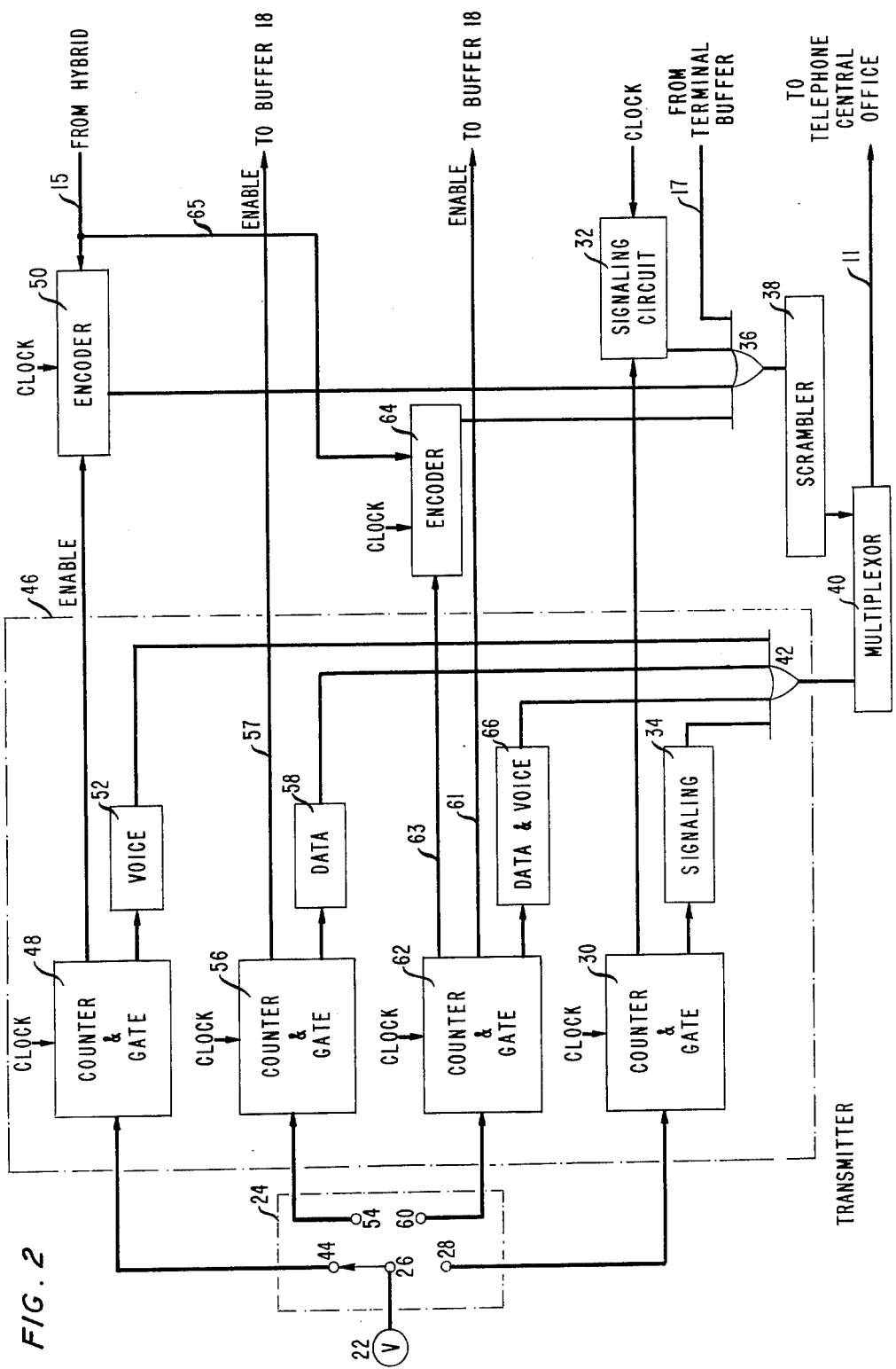
FIG. 2 shows details of the transmitter in FIG. 1.

Referring to FIG. 2, there are shown the details of transmitter 20 of FIG. 1. Transmitter 120 is a substantially similar transmitter. Voltage source 22 is connected to switch arm 26 of switch 24. In the idle state, switch arm 26 rests at terminal 28, thereby enabling the counter and gate circuit 30. In response to clock pulses, counter and gate circuit 30 enables (1) signaling circuit 32 for seven pulse periods, corresponding to the pulse periods of an eight-bit time slot, and (2) signaling signature circuit 34 for the eighth pulse period.

In response to enabling pulses from counter and gate circuit 30, signaling circuit 32 generates an idle code such as '1111111'. The idle code is transmitted in a bit stream in response to clock pulses through OR gate 36 to scrambler 38 and then to multiplexer 40.

Every eighth pulse period, in response to an enabling pulse from counter and gate circuit 30, signaling signature circuit 34 generates a signature bit '0'. The signature bit '0' is used in receiver 170 at location 110 (or receiver 70 at location 10) for identifying the type of signal being received, namely, signaling information. Furthermore, because every eighth bit is a '0', byte synchronization is obtained as will be described in more detail hereinbelow. Signature bit '0' is transmitted through OR gate 42 to multiplexer 40.

At multiplexer 40, the scrambled idle code from scrambler 38, in the first seven bit-positions of an eight-bit time slot, and the signature bit '0' in the eighth bit-position, from OR gate 42 are multiplexed for transmission as a serial bit stream on channel 11 to telephone central office 172.

In the event a user at location 10 desires to transmit voice signals only to location 110, switch arm 26 of switch 24 is set at terminal 44. Terminal 44 is connected to counter and gate circuit 48 of mode control circuit 46. In response to clock pulses, counter and gate circuit 48 enables (1) encoder 50 for seven consecutive pulse periods corresponding to an eight-bit time slot, and (2) voice signature circuit 52 every eighth pulse period.

When encoder 50 is enabled, voice signals on lead 15 are encoded and the encoded bit stream is clocked through OR gate 36 into scrambler 38. Scrambler 38 scrambles the encoded voice bits for facilitating frame and byte synchronization at receiver 170 (or 70), to be described more fully hereinbelow. The scrambled encoded bits are serially shifted into multiplexer 40.

As stated hereinabove, every eighth pulse period, voice signature circuit 52 is enabled. In response to the enabling pulse, a voice signature bit is generated and clocked through OR gate 42 to multiplexer 40. The voice signature bits will be described more fully hereinbelow with reference to FIG. 5.

The scrambled encoded voice bits from scrambler 38 and the voice signature bits from OR gate 42 are multiplexed at multiplexer 40 for transmission over channel 11 to telephone central office 172.

When data is to be transmitted from location 10, switch arm 26 of switch 24 is set at terminal 54, thereby enabling counter and gate circuit 56. In response to clock pulses, counter and gate circuit 56 enables (1) buffer 18 and terminal 16 via lead 57 for seven consecutive pulse periods of an eight-bit time slot, and (2) data signature circuit 58 every eighth pulse period.

In response to the enabling pulses on lead 57, data bits from buffer 18 are clocked via lead 17 through OR gate 36 into scrambler 38 and thence to multiplexer 40.

Every eighth pulse period, data signature circuit 58 generates a signature bit, "1", in the preferred embodiment. The signature bits for the data mode of transmission is described in more detail with reference to FIG. 4 hereinbelow. The signature bits are clocked through OR gate 42 into multiplexer 40.

At multiplexer 40, the scrambled data bits from scrambler 38 and the signature bits from OR gate 42 are multiplexed for transmission as a serial bit stream over channel 11 to telephone central office 172.

For the transmission of a combination of both encoded voice signals and data signals, the switch arm 26 of switch 24 is set at terminal 60, thereby enabling counter and gate circuit 62. In response to the first four pulse periods corresponding to an eight-bit time slot, lead 63 connected to encoder 64 is enabled. In response to pulses corresponding to the fifth and sixth bit-positions of the eight-bit time slots one, three and five of a frame comprising five time slots, and in response to pulses corresponding to the fifth, sixth and seventh bit-positions of the eight-bit time slots two and four, lead 61 connected to buffer 18 is enabled. In the remaining pulse periods of the aforesaid five time slot frame, data and voice signature circuit 66 is enabled. The signature bits and the frame format for the aforesaid combined transmission mode is described in more detail with reference to FIG. 6 hereinbelow.

Referring to FIG. 2, voice signals on lead 65 from hybrid 14 are encoded at encoder 64 by the method of adaptive differential pulse code modulation (ADPCM) using four bits. Other reduced bit rate voice encoders, such as delta modulation or adaptive delta modulation, may be used instead of the aforesaid ADPCM. In response to the aforesaid enabling pulses, the encoded voice signals are shifted from encoder 64 through OR gate 36 into scrambler 38.

Likewise, in response to the aforesaid enabling pulses on lead 61, data signals from buffer 18 are shifted over lead 17 through OR gate 36 into scrambler 38. The scrambled encoded voice bits and data bits are then shifted into multiplexer 40.

Signature bits indicating the combined mode of transmission from data and voice signature circuit 66 are shifted through OR gate 42 into multiplexer 40. The scrambled data and encoded voice bits and the signature bits are serially shifted out of multiplexer 40 for transmission over channel 11 to telephone central office 172.

Figure 3:
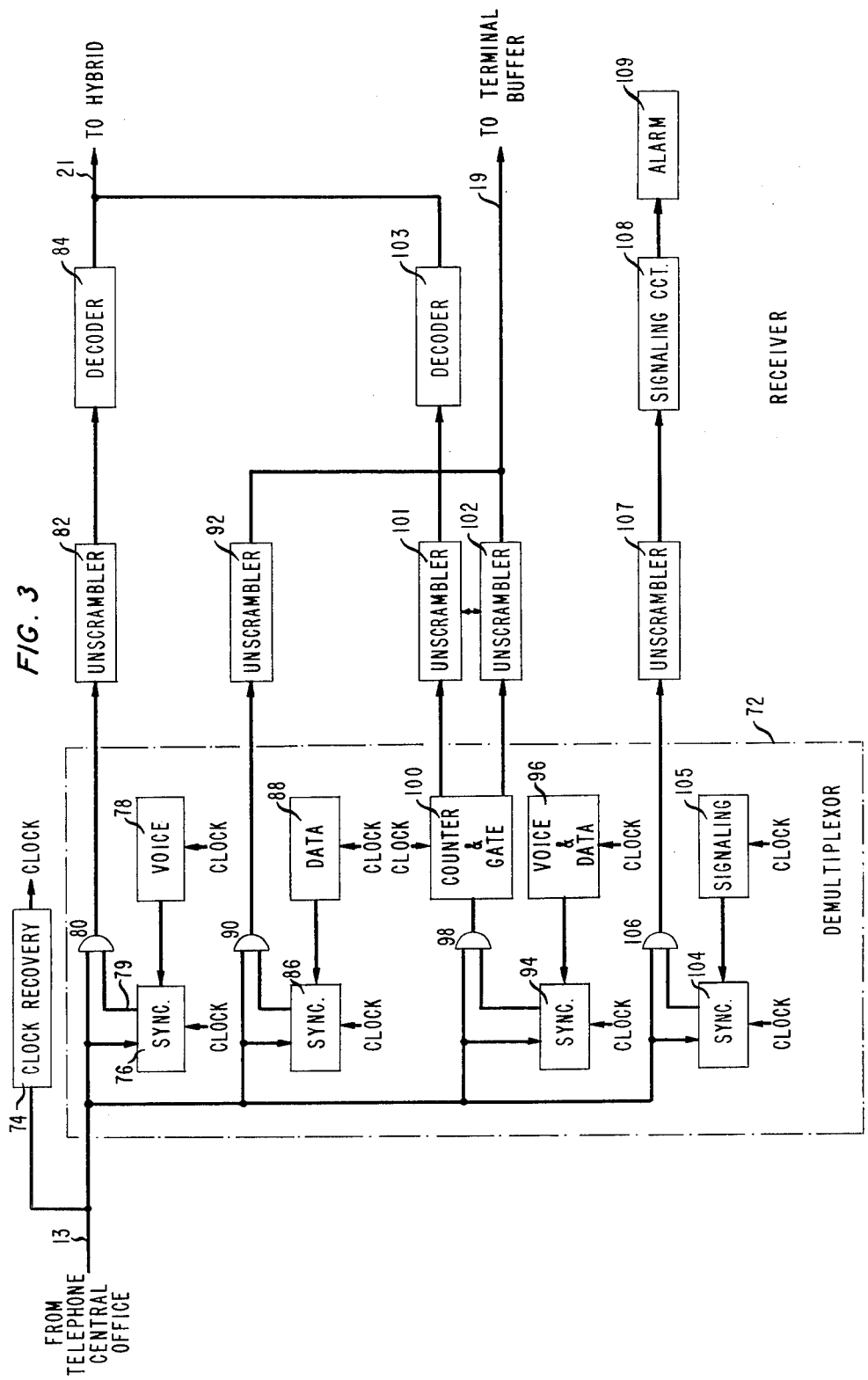
FIG. 3 shows details of the receiver in FIG. 1.

Referring to FIG. 3, there is shown the receiver 70 of FIG. 1 (or receiver 170 of FIG. 1). The multiplexed stream of information bits from telephone central office 172 is received over channel 13 at demultiplexer 72. Clock timing from a central location within the telephone network 174 is recovered from the aforesaid multiplexed bit stream at clock recovery circuit 74, thereby providing the necessary clock pulses for use at location 10 (or location 110). That is, bit synchronization is realized at clock recovery circuit 74.

The multiplexed information bit stream on channel 13 is fed into AND gate 80 and into byte and frame synchronizing circuit 76. Signature bits for indicating voice mode of transmission are generated from voice signature circuit 78 and clocked into byte and frame synchronizing circuit 76. Byte and frame synchronizing circuit 76 provides two functions: one, the received multiplexed stream is examined for determining whether the signature bits therein match those from voice signature circuit 78; and two, when there is a match, byte and frame synchronization is simultaneously realized. Thereafter, lead 79 connected to AND gate 80 is enabled, thereby permitting the multiplexed bit to be entered in unscrambler circuit 82. Unscrambler circuit 82 provides two functions: one, the signature bits are masked, and two, the remaining bits are inscrambled, i.e., the original coded bit stream is restored. The unscrambled bits are transferred to decoder 84 where voice signals are restored and transferred to hybrid circuit 14 over lead 21.

Likewise, the multiplexed bit stream received on channel 13 is simultaneously transferred to AND gates 90, 98, 106 and byte and frame synchronizing circuits 86, 94 and 104, respectively. Signature bits from data signature circuit 88, voice and data signature circuit 96, and signaling signature circuit 105 are clocked into the byte and frame signature circuits 86, 94, and 104, respectively. As stated hereinabove, when there is a match the corresponding AND gate 90, 98 or 106 will be enabled.

When AND gate 90 is enabled, the data bit stream is transferred to unscrambler 92 and the unscrambled data is then transferred through lead 19 to buffer 18.

When AND gate 98 is enabled, counter and gate circuit 100 gates the encoded voice bits to unscrambler 101 and the data bits to unscrambler 102. Encoded voice bits are decoded at decoder 103 and then transferred over lead 21 to hybrid circuit 14. Data, signature, and stuffing bits are transferred to unscrambler 102. Thereafter, reordered data bits (i.e., unscrambled bits) are transferred over lead 19 to buffer 18. The bit format will be described in more detail with reference to FIG. 6, hereinbelow.

As stated hereinabove, signature and signaling bits will be transferred through enabled AND gate 106 to unscrambler 107 for masking the signature bits, unscrambling the signaling bits, and transferring the unscrambled bits to signaling circuit 108. Alternatively, the signature bits may be masked by using clock pulses to gate only the signature bits through the unscrambler 107. As stated hereinabove, in the idle state, a scrambled idle code is received on channel 13. Should there be a fault in the transmission circuit or apparatus, alarm circuit 109 will be alerted. Likewise, alerting circuits (not shown) are used at locations 10 and 110 to alert a user that the distant location is attempting to transmit a message or has transmitted a message.

Referring more particularly to FIG. 4, there are shown eight bit-positions of an eight-bit time slot. When data signals only are to be transmitted, data bits are assigned to the first seven bit-positions. A signature bit is assigned to the eighth bit-position. In the preferred embodiment, a sequence of "1s" appear in the eighth bit-position. Such a scheme is in consonance with the T-carrier system, often used in digital transmission, wherein each and every eight-bit time slot must have at least one "1" bit.

Referring to FIG. 5, there are shown a frame of five successive eight-bit time slots for use in transmission of encoded voice signals only. In time slot one, the first six bit-positions are filled with encoded voice bits. The eighth bit-position is filled with a "0" (zero), useful as part of a sequence of signature bits: 011110111101111 . . . . Because the eighth bit-position is a "0", when the first six bit-positions have "0s" inserted therein, the seventh bit-position must have a "1" (one) inserted therein. Such an entry will insure a data format compatible for digital transmission with T-carrier systems, as stated hereinabove. Where at least one of the encoded voice bits entered in the first six bit-positions is a "1", the seventh bit-position may be filled with an encoded voice bit which may be either a "1" or a "0".

Each of the time slots two through five have entered therein encoded voice signals in the first seven bit-positions. The eighth bit-position has a one entered therein. Thus, successive bits in the eighth bit-position provide a distinctive signature: 011110111101111 . . . , thereby indicating the content of a multiplexed stream as comprising encoded voice signals only.

Referring to FIG. 6, there are shown a frame of five time slots one through five for the transmission of a combination of encoded voice signals, data signals and signature bits for identifying the contents therein. As stated hereinabove, encoded voice signals are assigned to the first four bit-positions of each time slot. In time slots one, three and five, i.e., in odd numbered time slots, data bits are assigned to bit-positions five and six, a "1" is entered into bit seven, and signature bit "0" is assigned to bit-position eight. In time slots two and four, i.e., in even numbered time slots, data bits are assigned to bit-positions five, six and seven, and a signature bit "1" is assigned to bit-position eight.

Because voice signals are sampled at the rate of 8,000 (or 8K) times a second and because four bits are used to encode the voice sample by the aforesaid ADPCM method, encoded voice bits are transmitted at the rate of 32 kb/s (4 bits×8K times/sec).

Likewise, because data signal bits are selected at 8000 times a second, and because twelve data bits are selected every five time slots (two each in time slots one, three, and five, and three each in time slots two and four), the rate at which the data bits are transmitted is 19.2 kb/s (12/5 bits×8K times/sec).

The signature bits in bit-position eight from odd numbered time slots is "0". The signature bit from even numbered time slots in bit-position eight is "1". Thus, the signature bits obtained from successive time slots provide the unique pattern: 010100101001010 . . . . By varying the number of time slots in the frame, and by varying the signature, different data rates of transmission may be obtained.

Referring to FIG. 7, there is shown an eight-bit time slot useful for transmitting signaling information between locations 10 and 110. The first seven bit-positions contain signaling information. The eighth bit-position is used for the signature bit, '0' in the preferred embodiment. Thus, during the idle state, a unique idle signaling code '11111110' is transmitted between locations 10 and 110. Likewise, other signaling information may be transmitted between locations 10 and 110, in each case the signature bit remaining '0'. That signaling information is being transmitted between locations 10 and 110 is indicated by the bits in every eighth bit-position being 0000 . . . .

METHOD OF OPERATION

As stated herinabove transmission between locations 10 and 110 are independent. That is, there can be transmission in only one direction, or there can be transmission in both directions simultaneously. Furthermore, the mode of transmission, that is, voice signals only, data signals only, or both voice and data signals, is independent in each direction.

Referring to FIGS. 1, 2, and 3, transmission of voice signals only is initiated, for example from location 10 to location 110, by moving selector arm 26 from the idle terminal 28 to the terminal 44. Thereafter, at receiver 170, byte and frame synchronizing circuit 76 detects the voice signal signature bits and enables AND gate 80. Encoded voice bits are unscrambled at unscrambler 82 and then decoded at decoder 84. Voice signals are thereafter transferred through hybird circuit 114 to telephone 112 or to a recorder (not shown). Because a few frames are necessary for detection at receiver 170, message transmission from location 10 begins only after a preselected number of frames. Alternatively, an answer signal may be transmitted from location 110 to location 10 (not shown). As stated hereinabove, an alerting circuit (not shown) may be used to alert a user that a message either has arrived or is in the process of arriving.

After message transmission is completed, selector arm 26 of transmitter 20 is restored to the idle position terminal 28, thereby signaling an end of transmission to receiver 170 at location 110.

What is claimed is:

1. A method for the transmission of information in any one of three modes, said modes being digitally encoded voice signals, data signals, or a combination of said digitally encoded voice signals and said data signals, over a single, bidirectional digital transmission channel interconnecting first and second customer locations by the steps of
    (1) selecting said information transmission mode,
    (2) initiating said transmission,
    (3) providing a unique digital signature for identifying each of said information modes, and
    (4) multiplexing said signals and said unique signature for transmission between said first and second locations.

2. The method for the transmission of information according to claim 1 wherein said initiating step comprises the further steps of
    (1) prior to said information transmission mode selection step, providing a unique digital signature indicating said initiating step,
    (2) generating a signaling code,
    (3) multiplexing said unique signature and said signaling code for transmission between said first and second locations for a predetermined period.

3. The method for the transmission of information according to claim 1 wherein said initiating step comprises the further steps of
    (1) inhibiting the transmission of said unique signature for identifying each of said information modes, and instead thereof transmitting a digital signaling signature for a preselected period,
    (2) generating a signaling code, and
    (3) multiplexing said signaling code and said signaling signature for transmission between said first and second locations for said preselected period.

4. The method for the transmission of information according to claim 3 wherein said signaling signature comprises the bit "0" (zero) in the eighth bit position of each eight bit time slot during said preselected transmission initiating period.

5. The method for the transmission of information according to claim 1 wherein said data signals are assigned to the first seven bit position of an eight bit time slot, and
    said unique signature comprises the bit "1" assigned to the eighth bit position of said eight bit time slot.

6. The method for transmission of information according to claim 1 wherein said voice signals are transmitted in a frame comprising five time slots, each of said time slots having eight bit positions, by the further steps of
    (1) sampling said voice signals;
    (2) encoding said voice signal samples using seven bits;
    (3) in the first time slot of said frame;

(a) assigning six of said encoded bits to the first six of said bit positions,
(b) when all of said six assigned, encoded bits are "0", entering a "1" in the seventh of said bit positions,
(c) when at least one of said six assigned and encoded bits is a "1", entering the seventh of said encoded bits to said seventh bit position,
(d) entering a "0" signature bit in the eighth of said bit positions;
(4) in each of second, third, fourth and fifth of said time slots in said frame,
(a) assigning said seven encoded voice bits to the first seven bit positions, and
(b) assigning the bit "1" in the eight bit position.

7. The method for the transmission of information according to claim 1 wherein said combination of said voice signals and said data signals are transmitted in a frame comprising five time slots, each of said time slots having eight bit positions, by the further steps of
(1) sampling said voice signals;
(2) encoding said voice signal samples using reduced bit rate voice encoders and using only four bits;
(3) in the first, third and fifth of said time slots of said frame,
(a) assigning said four encoded voice sample bits to the first four bit positions,
(b) assigning data bits to the fifth and sixth bit positions, and
(c) assigning the bits "1" and "0" to the seventh and eighth bit positions, respectively; and
(4) in the second and fourth of said time slots of said frame,
(a) assigning said four encoded voice sample bits to the first four bit positions,
(b) assigning data bits to the fifth, sixth and seventh bit positions, and
(c) assigning the bit "1" to the eighth bit position.

8. A method of simultaneous transmission of a combination of voice signals and data signals in a multiplexed stream of information bits over a single, bidirectional digital transmission channel comprising the steps of
(1) encoding a sample of said voice signals using four bits,
(2) assigning said four bits of encoded voice signal sample to four-bit positions of an 8-bit information time slot,
(3) assigning up to four bits of information from said data signals to the remaining four bit positions of said 8-bit time slot, and
(4) assigning a distinctive signature comprising a sequence of bits said bits using up to two-bit positions in said remaining four-bit positions instead of said data bits.

9. A method of simultaneous transmission of a combination of voice signals and data signals in a multiplexed stream of information bits over a single, bidirectional digital transmission channel comprising the steps of
(1) encoding a sample of said voice signals using four bits,
(2) assigning said four bits of encoded voice signal sample to four-bit positions of an 8-bit information time slot, and
(3) assigning up to four bits of information from said data signals to the remaining four bit positions of said 8-bit time slot, said step of encoding a sample of said voice signals using four bits uses the method of adaptive differential pulse code modulation.

10. A method of simultaneous transmission of a combination of voice signals and data signals in a multiplexed stream of information bits over a single, bidirectional digital transmission channel comprising the steps of
(1) encoding a sample of said voice signals using four bits,
(2) assigning said four bits of encoded voice signal sample to four-bit positions of an 8-bit information time slot, and
(3) assigning up to four bits of information from said data signals to the remaining four bit positions of said 8-bit time slot,
(4) assigning a distinctive signature comprising a sequence of bits said bits using up to two-bit positions in said remaining four-bit positions instead of said data bits, said step of encoding a sample of said voice signals using four bits uses the method of adaptive differential pulse code modulation.

11. Apparatus for the transmission of voice signals only, data signals only, or a combination of said voice signals and said data signals, over a single, bidirectional, digital transmission channel comprising
means for encoding said voice signals using low bit rate voice encoders, and
means for multiplexing said encoded voice signal samples and said data signals, and
means for providing a distinctive signature comprising a sequence of bits using up to two-bit positions, and
means for multiplexing said signature bits with said encoded voice signal samples and said data signals,
said distinctive signature being used by a receiving terminal for determining whether said multiplexed stream comprises said voice signals only, said data signals only, or said combination of said voice signals and said data signals.

12. Apparatus for receiving a multiplexed stream of encoded voice signals only, data signals only, or a combination of said encoded voice signals and said data signals over a single, bidirectional, digital transmission channel comprising
means for demultiplexing said multiplexed stream,
means for extracting up to two bits from each of a plurality of successive 8-bit time slots to derive a sequence of said bits, and
means for determining from said sequence of said bits whether said multiplexed stream is comprised of said encoded voice signals only, said data signals only, or said combination of said encoded voice signals and said data signals.

13. A pulse code transmission system for combined encoded voice and data signals comprising
a source of encoded voice signals,
a source of data signals,
a source of transmission mode signature bits for uniquely identifying voice, data or combined voice and data pulse groups, and
multiplexing means for combining signals from said sources into fixed pulse groups, said signature bits ensuring at least one binary "1" in each said pulse group and simultaneously uniquely identifying the appropriate one of said transmission modes.

* * * * *